US011916214B2

(12) United States Patent
Oono et al.

(10) Patent No.: US 11,916,214 B2
(45) Date of Patent: Feb. 27, 2024

(54) POWER SUPPLY DEVICE COMPRISING SHEET HEATER TO HEAT BATTERY CELLS

(71) Applicant: SANYO Electric Co., Ltd., Daito (JP)

(72) Inventors: Yasuhiro Oono, Osaka (JP); Kentaro Okamura, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 189 days.

(21) Appl. No.: 17/442,043

(22) PCT Filed: Mar. 19, 2020

(86) PCT No.: PCT/JP2020/012308
§ 371 (c)(1),
(2) Date: Sep. 22, 2021

(87) PCT Pub. No.: WO2020/196266
PCT Pub. Date: Oct. 1, 2020

(65) Prior Publication Data
US 2022/0190406 A1    Jun. 16, 2022

(30) Foreign Application Priority Data

Mar. 28, 2019   (JP) .................................. 2019-064716

(51) Int. Cl.
*H01M 10/6571*   (2014.01)
*H01M 10/615*    (2014.01)
(Continued)

(52) U.S. Cl.
CPC ..... *H01M 10/6571* (2015.04); *H01M 10/615* (2015.04); *H01M 10/617* (2015.04);
(Continued)

(58) Field of Classification Search
CPC .......... H01M 10/6571; H01M 10/615; H01M 10/617; H01M 10/643; H01M 50/213
See application file for complete search history.

(56) References Cited

U.S. PATENT DOCUMENTS

2012/0141857 A1    6/2012  Nakashima et al.
2018/0062223 A1*   3/2018  Murata ............. H01M 10/6571
2018/0261804 A1    9/2018  Bayles et al.

FOREIGN PATENT DOCUMENTS

EP    2365560 A1 *  9/2011  .......... H01M 10/613
EP    2530778 A1    12/2012
(Continued)

OTHER PUBLICATIONS

The Extended European Search Report dated May 3, 2022, issued in counterpart EP Application No. 20776764.1. (8 pages).
(Continued)

*Primary Examiner* — Jimmy Vo
(74) *Attorney, Agent, or Firm* — WHDA, LLP

(57) ABSTRACT

Battery cells may be heated safely and reliably. A power supply device includes a battery block (10) including battery cells including positive and negative electrodes at both ends, lead plate (2) connected to the positive and negative electrodes of the battery cells to electrically connect the battery cells, and a sheet heater (3) configured to heat the battery cells. The sheet heater (3) is thermally coupled and placed on one surface on the negative electrode of the battery cell via one of the lead plates (2).

10 Claims, 9 Drawing Sheets

(51) Int. Cl.
  *H01M 10/617*  (2014.01)
  *H01M 10/643*  (2014.01)
  *H01M 50/213*  (2021.01)
  *H01M 50/50*   (2021.01)
  *H01M 50/224*  (2021.01)

(52) U.S. Cl.
  CPC ....... *H01M 10/643* (2015.04); *H01M 50/213* (2021.01); *H01M 50/224* (2021.01); *H01M 50/50* (2021.01)

(56) References Cited

FOREIGN PATENT DOCUMENTS

| | | | | |
|---|---|---|---|---|
| EP | 3531473 | A1 * | 8/2019 | .......... H01M 10/425 |
| JP | 2007-213939 | A | 8/2007 | |
| JP | 2007213939 | A * | 8/2007 | |
| JP | 2018-6043 | A | 1/2018 | |
| WO | 2011/135762 | A1 | 11/2011 | |

OTHER PUBLICATIONS

English Translation of International Search Report dated Jun. 2, 2020, issued in counterpart Application No. PCT/JP2020/012308. (2 pages).

* cited by examiner

POWER SUPPLY DEVICE COMPRISING SHEET HEATER TO HEAT BATTERY CELLS

TECHNICAL FIELD

The present invention relates to a power supply device including battery cells, particularly to a power supply device including a sheet heater configured to heat the battery cells in a low temperature environment.

BACKGROUND ART

A power supply device configured to heat battery cells with a sheet heater has been developed. (PTL 1)

In a power supply device of PTL 1, as shown in an exploded perspective view of FIG. 9, sheet heaters 93 are disposed on both surfaces of battery block 90. In battery block 90, battery cells 91 are set in a parallel posture in which respective both end surfaces of battery cells 91 are flush with one another, and battery cells 91 are connected to one another by lead plates 92 disposed on both surfaces of battery cells 91. Sheet heaters 93 are placed on an inner case outside lead plates 92, and indirectly heat battery cells 91 via lead plates 92.

CITATION LIST

Patent Literature

PTL 1: Japanese Patent Laid-Open Publication No. 2007-213939

SUMMARY

Technical Problem

In the power supply device shown in FIG. 9, battery cells 91 are indirectly heated by sheet heaters 93 attached to the inner case with lead plates 92 interposed. Lead plates 92 are placed on both end surfaces of battery cell 91. While this power supply device may safely heat the low-temperature battery cells by heating the battery cells from both ends, it is difficult to ensure thermal efficiency. This is because, when the sheet heaters are directly attached to the lead plates, a positive electrode lead plate and a negative electrode lead plate are disposed close to each other on both end surfaces of the battery block. One of the sheet heaters is placed on surfaces of the positive electrode lead plate and the negative electrode lead plate. That is, in the structure where one of the sheet heaters is placed on the surfaces of the positive electrode lead plate and the negative electrode lead plate, the sheet heater short-circuits the positive electrode lead plate and the negative electrode lead plate, so that safety is impaired.

The present invention addresses the above-described disadvantage of the conventional power supply device, and one of objects of the present invention is to provide a power supply device that can ensure high safety while efficiently heating each battery cell, so that reliability can be improved

Solution to Problem

A power supply device according to an aspect of the present invention includes a battery block 10 including battery cells 1 including positive electrode 1A and negative electrode 1B at both ends, lead plates 2 connected to positive electrodes 1A and negative electrodes 1B of battery cells 1 to electrically connect battery cells 1, and a sheet heater 3 configured to heat battery cells 1. The sheet heater 3 is thermally coupled to and placed on one surface on a side of the negative electrodes 1B of the battery cells 1 via lead plate 2 interposed between the sheet heater and the negative electrodes of the battery cells.

Advantageous Effect of Invention

The power supply device described above may heat the batteries safely and reliably.

DESCRIPTION OF EMBODIMENT

Figure 1:
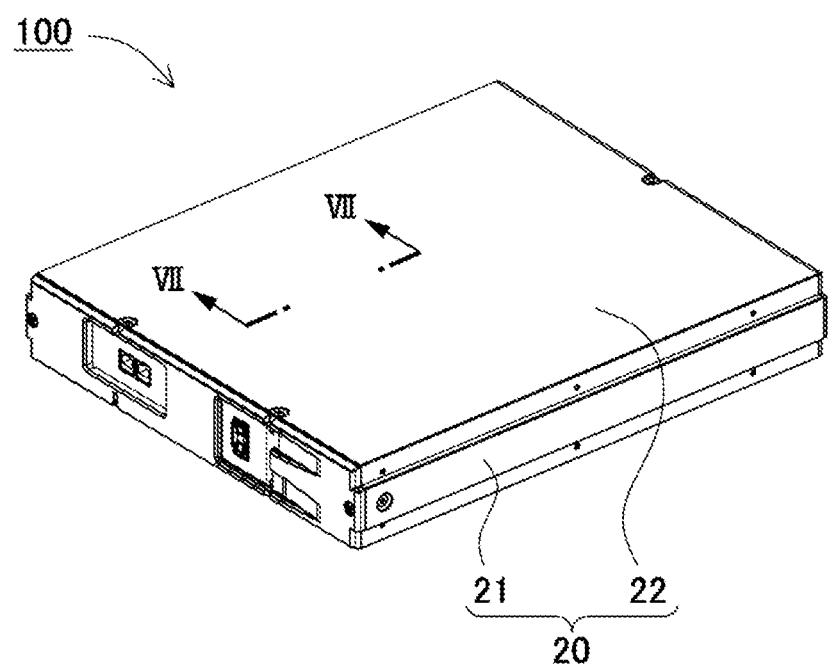
FIG. 1 is a perspective view of a power supply device according to an exemplary embodiment of the present invention.

Hereinafter, the present invention will be described in detail with reference to the drawings. In the following description, terms indicating specific directions and positions (e.g., "upper", "lower", and other terms including those terms) are used as necessary, but these terms are used to facilitate understanding of the invention with reference to the drawings, and the technical scope of the present invention is not limited by meanings of these terms. Portions denoted by the same reference marks in the plurality of drawings indicate the same or equivalent portions or members.

Further, the following exemplary embodiment describe specific examples of the technical idea of the present invention, and does not limit the present invention to the following. In addition, unless otherwise specified, dimensions, materials, shapes, relative arrangements, and the like of the components described below are not intended to limit the scope of the present invention, but are intended to be illustrative. In addition, contents described in one exemplary embodiment and example are also applicable to other exemplary embodiments and examples. In addition, sizes, positional relationships, and the like of members shown in the drawings may be exaggerated for clarity of description.

A power supply device according to a first aspect of the present invention includes: a battery block configured of a plurality of battery cells each provided with a positive electrode and a negative electrode at both ends; a lead plate connected to the positive electrodes and the negative electrodes of the battery cells to electrically connect the battery cells; and a sheet heater configured to heat the battery cells, wherein the sheet heater is laminated on one surface on a side of the negative electrodes of the battery cells in a thermally coupled state with the lead plate interposed.

In the power supply device described above, each of the battery cells is heated from the one surface on the side of the negative electrode by the sheet heater, so that high safety can be ensured, and reliability as the power supply device can be improved. Since the battery cell is provided with the positive electrode in a metal battery case in an insulated manner, the positive electrode is disposed in an end portion on the side of the positive electrode with an insulator interposed. When a positive electrode lead plate and a negative electrode lead plate are disposed close to each other, and the sheet heater is laminated on surfaces of the positive electrode lead plate and the negative electrode lead plate, moisture absorbed in a conductive portion of the sheet heater or a base sheet of the sheet heater in the power supply device causes a short circuit or electric leakage between the positive electrode and the negative electrode, which causes a decrease in safety. An end portion of the battery cell on the side of the negative electrode is located on a bottom surface of an exterior can and on an end portion opposite to the positive electrode. The sheet heater configured to heat the exterior can from the bottom surface can efficiently conduct heat energy supplied from the lead plate to the whole and quickly heat the whole battery cell. On the side of the positive electrode of the battery cell, the positive electrode is disposed with the insulator interposed. The insulator has extremely low thermal conductivity as compared with metal or the like. For example, as compared with aluminum used for the exterior can, the thermal conductivity of a general insulator is as extremely small as $1/100$ or less, and thermal energy supplied to the positive electrode with the lead plate interposed is blocked by the insulator and is not efficiently conducted to the exterior case. Therefore, even when the battery cell is heated from both the side of the positive electrode and the side of the negative electrode, the thermal energy supplied to the side of the positive electrode is blocked by the insulator and is efficiently prevented from being conducted to the whole, and the thermal energy supplied to the side of the negative electrode is extremely efficiently conducted to the whole. The power supply device described above is characterized in that high safety can be ensured while heating the whole battery cell in a state comparable to a device configured to heat a battery cell from both surfaces by heating the battery cell from the one side of the negative electrode.

In the power supply device according to a second aspect of the present invention, the battery block is divided into a plurality of core modules, each of the core modules includes a plurality of the battery cells, in the core module, the plurality of battery cells are disposed in a parallel posture to one another, a negative electrode surface where the negative electrodes of the plurality of battery cells are disposed in a same plane, and a positive electrode surface where the positive electrodes of the plurality of battery cells are disposed in a same plane are disposed in an opposing surfaces to each other, in the core module, the lead plate is disposed on the negative electrode surface and the positive electrode surface, a negative electrode lead plate on the negative electrode surface is connected to the negative electrodes of the plurality of battery cells, a positive electrode lead plate on the positive electrode surface is connected to the positive electrodes of the plurality of battery cells, and on a side of the negative electrode surface that is one surface of the core module, the sheet heater is thermally coupled to and laminated on a surface of the negative electrode lead plate, and heats the battery cells from the side of the negative electrodes that is one end portions of the battery cells with the negative electrode lead plate interposed.

In the power supply device described above, while a large number of the battery cells disposed in parallel to each other are heated efficiently and quickly heated by the sheet heater, the overall structure can be simplified and mass production of the battery cells can be efficiently performed.

In the power supply device according to a third aspect of the present invention, the sheet heater includes: a base sheet made of a nonwoven fabric; a heater wire sewn to the base sheet; and an insulating sheet configured to protect the heater wire, and the insulating sheet is disposed in contact with the lead plate.

The power supply device described above is characterized in that each of the battery cells can be uniformly heated by the sheet heater while surely insulating the heater wire of the sheet heater.

In the power supply device according to a fourth aspect of the present invention, in the battery block, the plurality of core modules are disposed in an array where the negative electrode surface and the positive electrode surface are alternately located in a same plane, the sheet heater includes: a plurality of heating sheet portions each configured to heat the negative electrode surface of each of the core modules; and a joining sheet portion configured to join the adjacent heating sheet portions, and the joining sheet portion is disposed at a position opposed to the positive electrode surface of the core module.

The power supply device described above is characterized in that the one sheet heater configured of the heating sheet portions and the joining sheet portion is disposed on the surface of the battery block, and all the battery cells are efficiently and quickly heated from the one surface on the side of the negative electrodes without being heated from the side of the positive electrodes, so that high safety can be ensured.

In the power supply device according to a fifth aspect of the present invention, each of the heating sheet portions has an elongated shape, and the joining sheet portion is joined to both end portions of the heating sheet portions in a longitudinal direction.

In the power supply device described above, the heating sheet portions of the sheet heater disposed on the surface of the battery block can be simply and easily disposed at accurate positions, and the side of the negative electrode of each of the battery cells can be efficiently heated with the lead plate interposed.

In the power supply device according to a sixth aspect of the present invention, the joining sheet portions is disposed with an insulating gap provided between the joining sheet portion and the positive electrode surface.

In the power supply device described above, the sheet heater can be disposed on the surface of the battery block while surely preventing heating of the side of the positive electrode by the sheet heater.

In the power supply device according to a seventh aspect of the present invention, the sheet heater includes a heater wire sewn to the joining sheet portion, and the heater wire sewed to the joining sheet portion and the heater wire of the heating sheet portion are a continuous heater wire.

The power supply device described above is characterized in that it is possible to improve reliability by surely electrically connecting the plurality of heating sheet portions and effectively prevent a failure such as disconnection of the heater wire while inexpensively performing mass production of the sheet heaters in which the plurality of heating sheet portions are joined by the joining sheet portion, and the heating sheet portions and the joining sheet portions have an integrated structure.

The power supply device according to an eighth aspect of the present invention includes a battery case configured to house the battery block, wherein a cushion sheet is disposed between the battery case and each of the heating sheet portions, and the cushion sheet elastically presses the heating sheet portion against the negative electrode lead plate.

The power supply device described above is characterized in that the heating sheet portion is surely and stably disposed on the lead plate in a thermally coupled state, and temperature unevenness of all the battery cells can be reduced and uniformly heated by the sheet heater.

In the power supply device according to a ninth aspect of the present invention, the sheet heaters are disposed on both surfaces of the battery block, the heating sheet portion is laminated on the negative electrode lead plate of each of the core modules, and the heating sheet portions are disposed in opposition to the side of the negative electrodes of all the battery cells.

The power supply device described above is characterized in that the battery block can be heated from both the surfaces to reduce temperature unevenness of each of the battery cells. In addition, the power supply device described above is characterized in that since the sheet heaters are disposed on both surfaces of the battery block, the battery block configured of a large number of the battery cells can be efficiently heated.

In the power supply device according to a tenth aspect of the present invention, each of the battery cells is a cylindrical battery.

The power supply device described above is characterized in that a cylindrical battery configuring the battery block can be quickly heated while ensuring high safety Exemplary Embodiment 1

Figure 2:
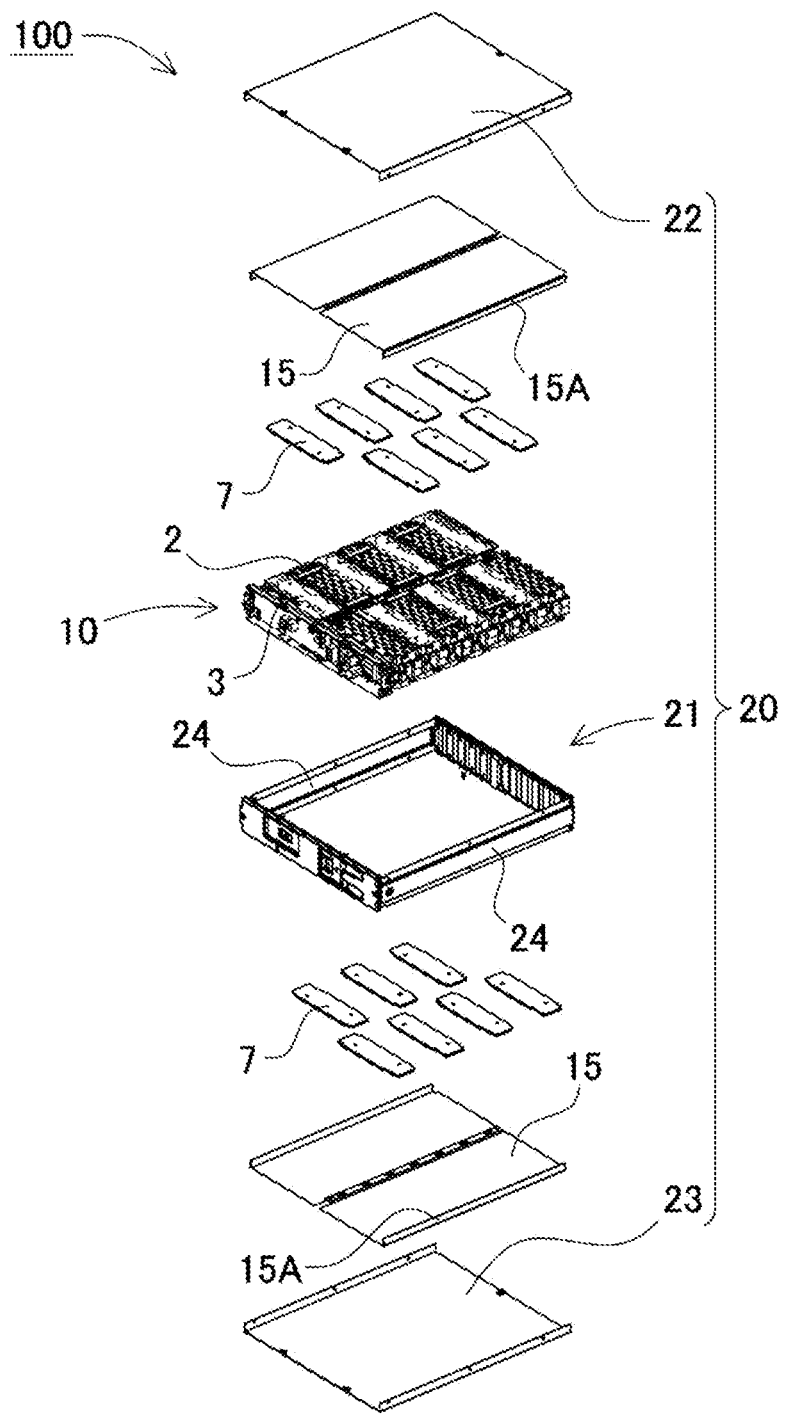
FIG. 2 is an exploded perspective view of the power supply device shown in FIG. 1.
Figure 3:
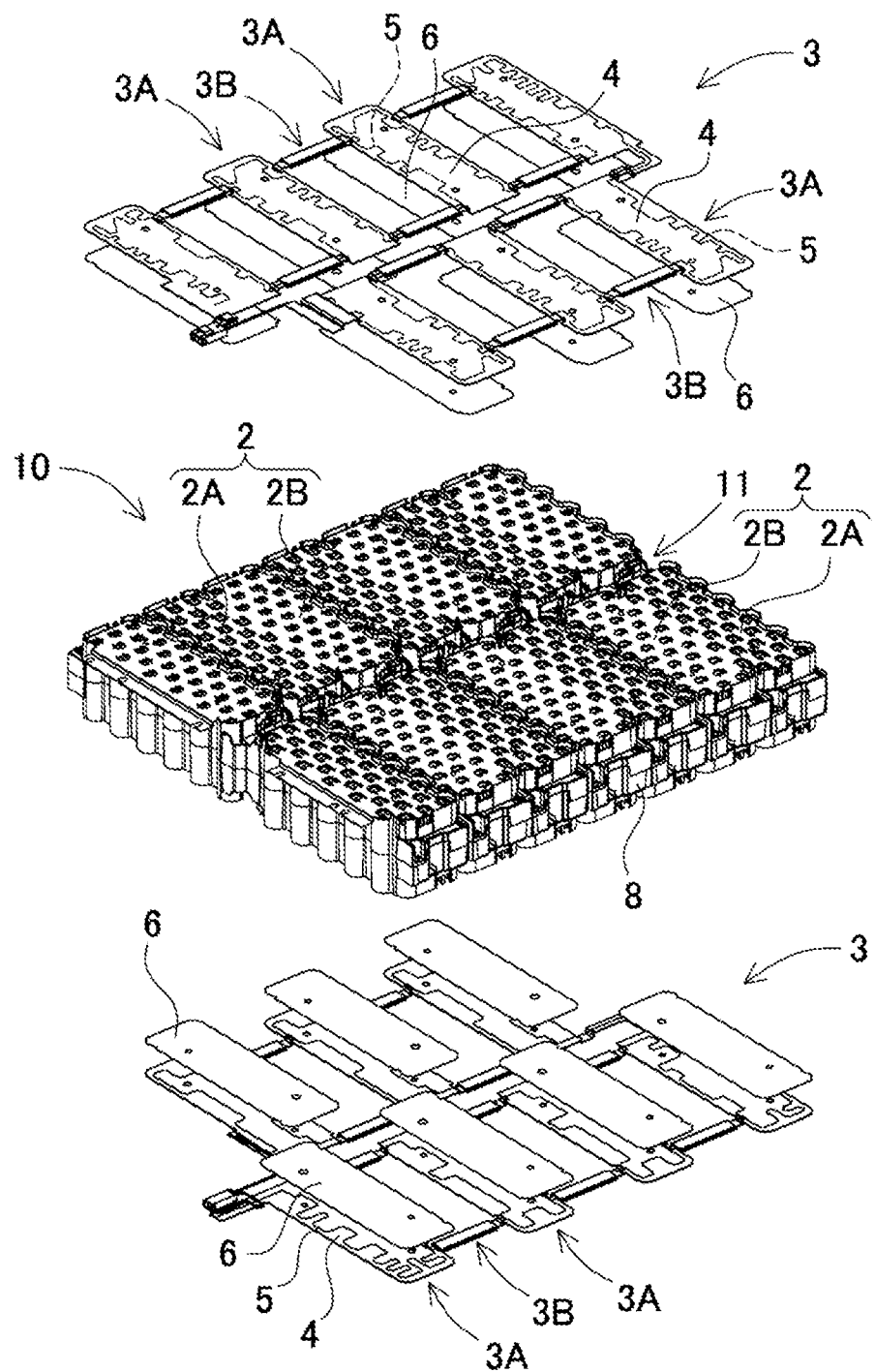
FIG. 3 is an exploded perspective view of the power supply device shown in FIG. 2 with a battery case removed.

A power supply device shown in FIGS. 1 to 3 is configured to be used for, e.g. an electric device, such as a base station, installed outdoors, and is suitable for an application in a use environment of low temperature. The power supply device is therefore used from low to high temperatures, for example, at ambient temperatures ranging from −30° C. to 80° C. The power supply device for outdoors is also required to have excellent durability and strength.

In power supply device 100 shown in FIGS. 1 to 3, battery block 10 is accommodated in battery case 20. Sheet heaters 3 is configured to heat battery cells 1 constituting battery block 10 are disposed inside battery case 20. Battery block 10 is divided into core modules 9. Each of core modules 9 includes a group of battery cells 1. In this core module 9, the group of battery cells 1 are disposed parallel to one another. Core modules 9 have negative electrode surface 9B and positive electrode surfaces 9A. Each of the core modules has a corresponding one of negative electrode surfaces 9B and a corresponding one of positive electrode surfaces 9A. Negative electrodes 1B of the group of battery cells 1 are flush with corresponding one of negative electrode surfaces 9B. Positive electrodes 1A of the group of battery cells 1 flush with the corresponding one of negative positive electrode surfaces 9A which is opposite to the corresponding one of negative electrode surfaces 9B. In core module 9, lead plate 2 is disposed on each of negative electrode surfaces 9B and each of positive electrode surfaces 9A. Negative electrode lead plate 2B on negative electrode surface 9B is connected to negative electrodes 1B of the group of battery cells 1, and positive electrode lead plate 2A on positive electrode surface 9A is connected to positive electrodes 1A of the group of battery cells 1, so that battery cells 1 are connected in parallel.

In battery block 10, the plurality of core modules 9 are disposed in an array where negative electrode surface 9B and positive electrode surface 9A are alternately located in a same plane. In battery block 10, the plurality of core modules 9 are disposed, positive electrode surface 9A being disposed between negative electrode surfaces 9B, negative electrode surface 9B being disposed between positive electrode surfaces 9A. In each of core modules 9, the plurality of battery cells 1 are connected by lead plate 2, each of negative electrode surface 9B and positive electrode surface 9A having an elongated shape. In core modules 9 of FIG. 4, the plurality of battery cells 1 are disposed in multiple stages and multiple rows, and each of negative electrode surface 9B and positive electrode surface 9A has an elongated shape. In battery block 10, the plurality of core modules 9 are disposed, elongated negative electrode surfaces 9B and positive electrode surfaces 9A being parallel to one another. In core module 9, negative electrode lead plate 2B made of one metal plate is disposed on negative electrode surface 9B, positive electrode lead plate 2A made of one metal plate is disposed on positive electrode surface 9A, negative electrodes 1B of battery cells 1 are welded to negative electrode lead plate 2B, positive electrodes 1A are welded to positive electrode lead plate 2A, and all battery cells 1 are connected in parallel by negative electrode lead plates 2B and positive electrode lead plates 2A.

In battery block 10 including a large number of core modules 9, core modules 9 are disposed in multiple stages and multiple rows. In battery block 10 shown in the plan view of FIG. 5, fourteen core modules 9 are disposed in two columns and seven rows while space 11 is provided between the two columns of core modules 9. In seven core modules 9 disposed in each column, positive electrode lead plates 2A and negative electrode lead plates 2B are connected in series to one another. In core modules 9 in each column, negative electrode lead plates 2B and positive electrode lead plates 2A are alternately disposed, and therefore, core modules 9 are connected in series by connecting lead plates 2 adjacent to each other. The two columns of core modules 9 may be connected to each other in series or in parallel.

Figure 4:
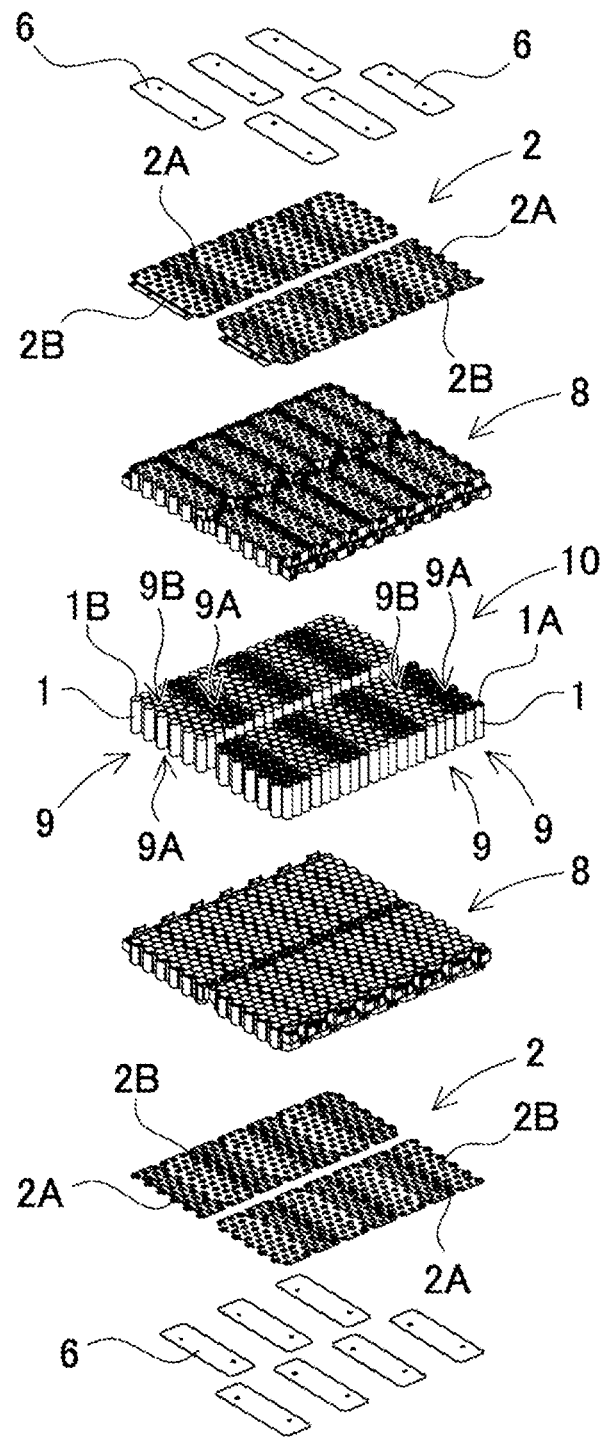
FIG. 4 is an exploded perspective view of a battery block shown in FIG. 3.
Figure 5:
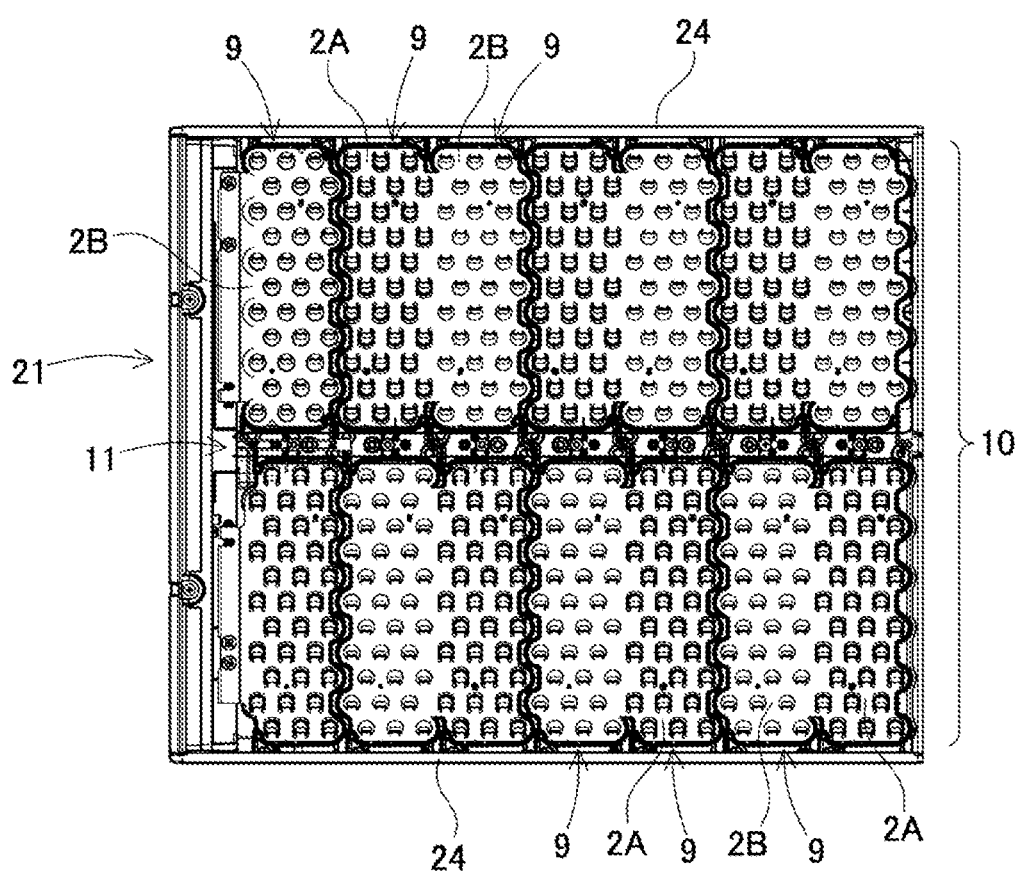
FIG. 5 is a plan view of the battery block of the power supply device shown in FIG. 1.

In core modules 9 disposed in tow, the upper and lower columns shown in the figure, core modules 9 in the upper column and core modules 9 in the lower column are disposed while negative electrode surfaces 9B and positive electrode surfaces 9A are alternately disposed. That is, each of negative electrode surfaces 9B of core modules 9 in the upper column are disposed between negative electrode surfaces 9B of core modules 9 in the lower column, and each of positive electrode surfaces 9A of core modules 9 in the upper column is disposed between positive electrode surfaces 9A of core modules 9 in the lower column. As shown in FIGS. 4 and 5, in battery block 10 with negative electrode surfaces 9B of core modules 9 disposed alternately, negative electrode surfaces 9B heated by each of sheet heaters 3 can be uniformly dispersed and disposed on the whole surface of battery block 10 to uniformly heat whole battery cells 1.

Figure 6:
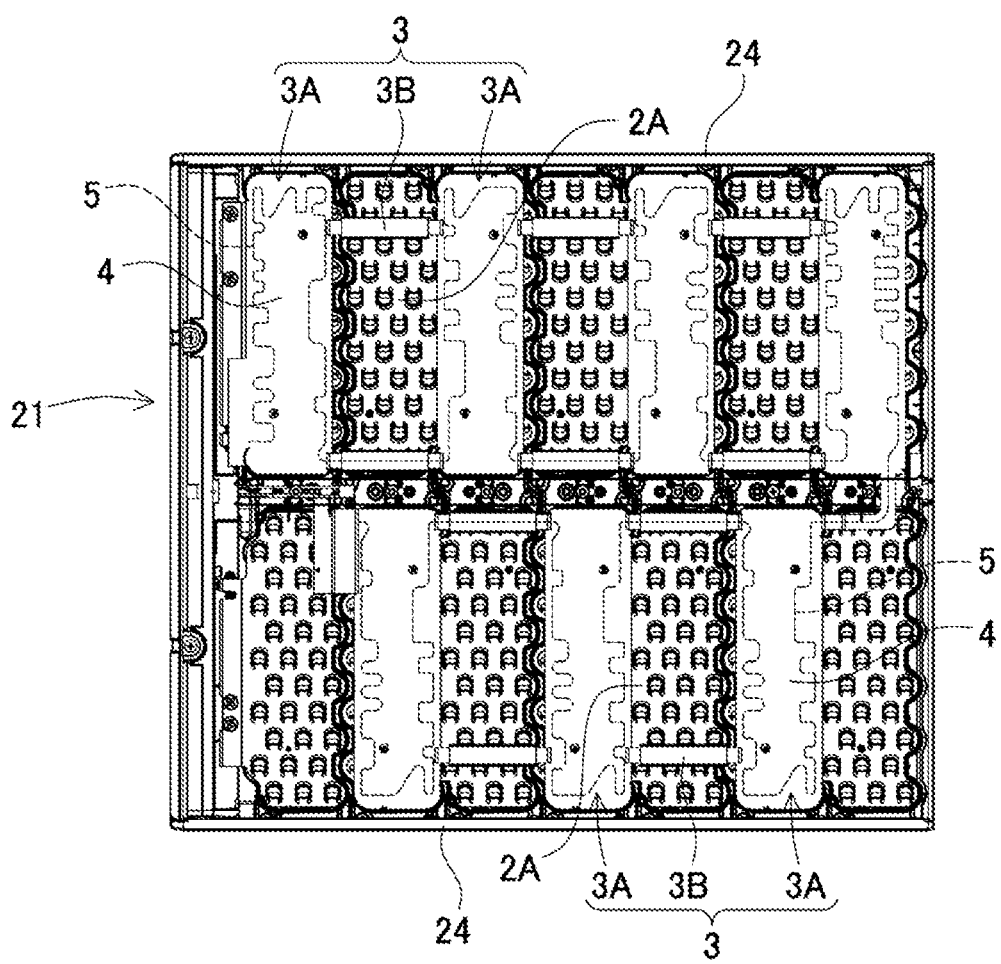
FIG. 6 is a plan view of the battery pack where a sheet heater is disposed in the battery block of the power supply device shown in FIG. 5.
Figure 7:
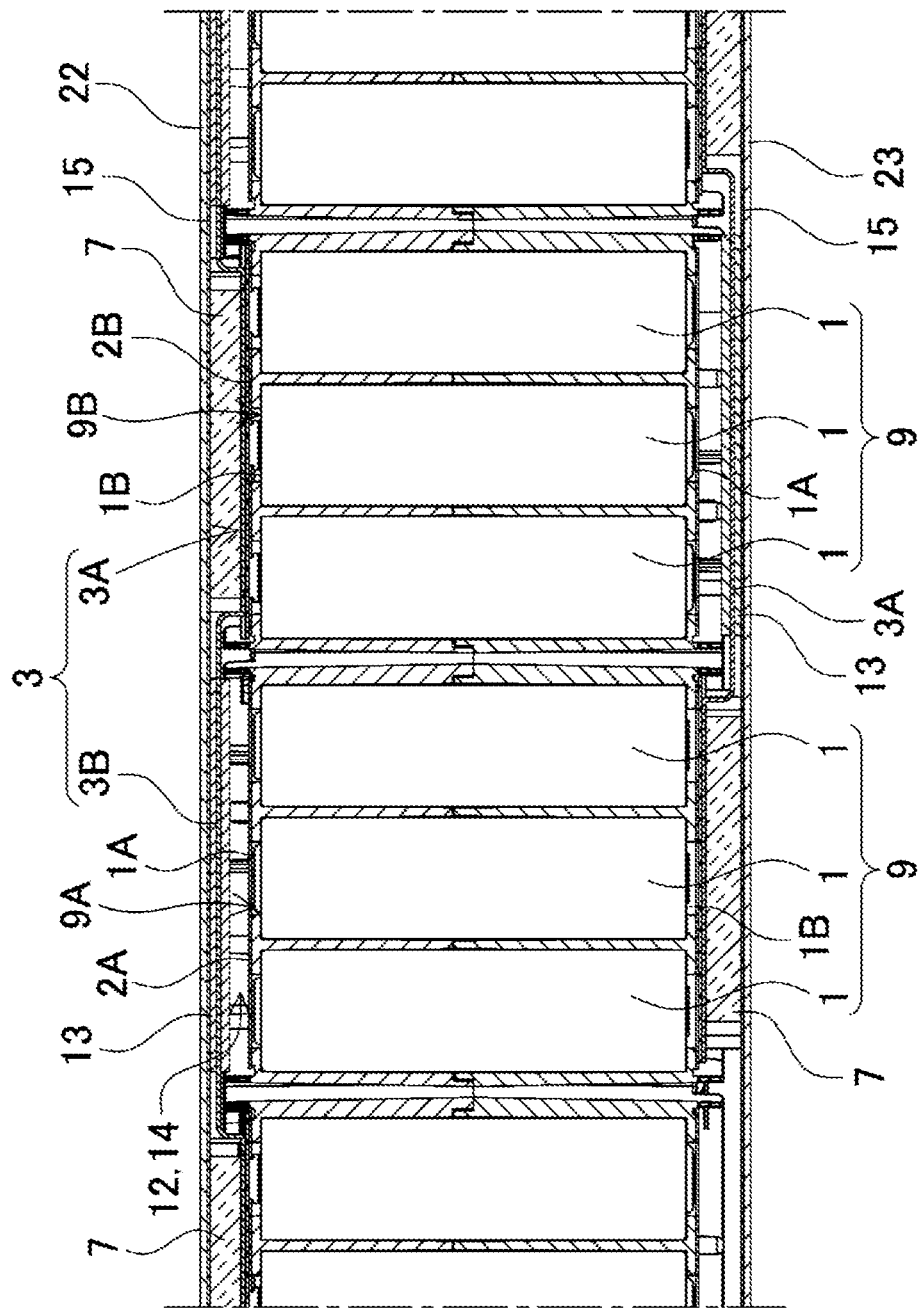
FIG. 7 is an enlarged vertical cross-sectional view of the power supply device along line VII-VII shown in FIG. 1.
Figure 8:
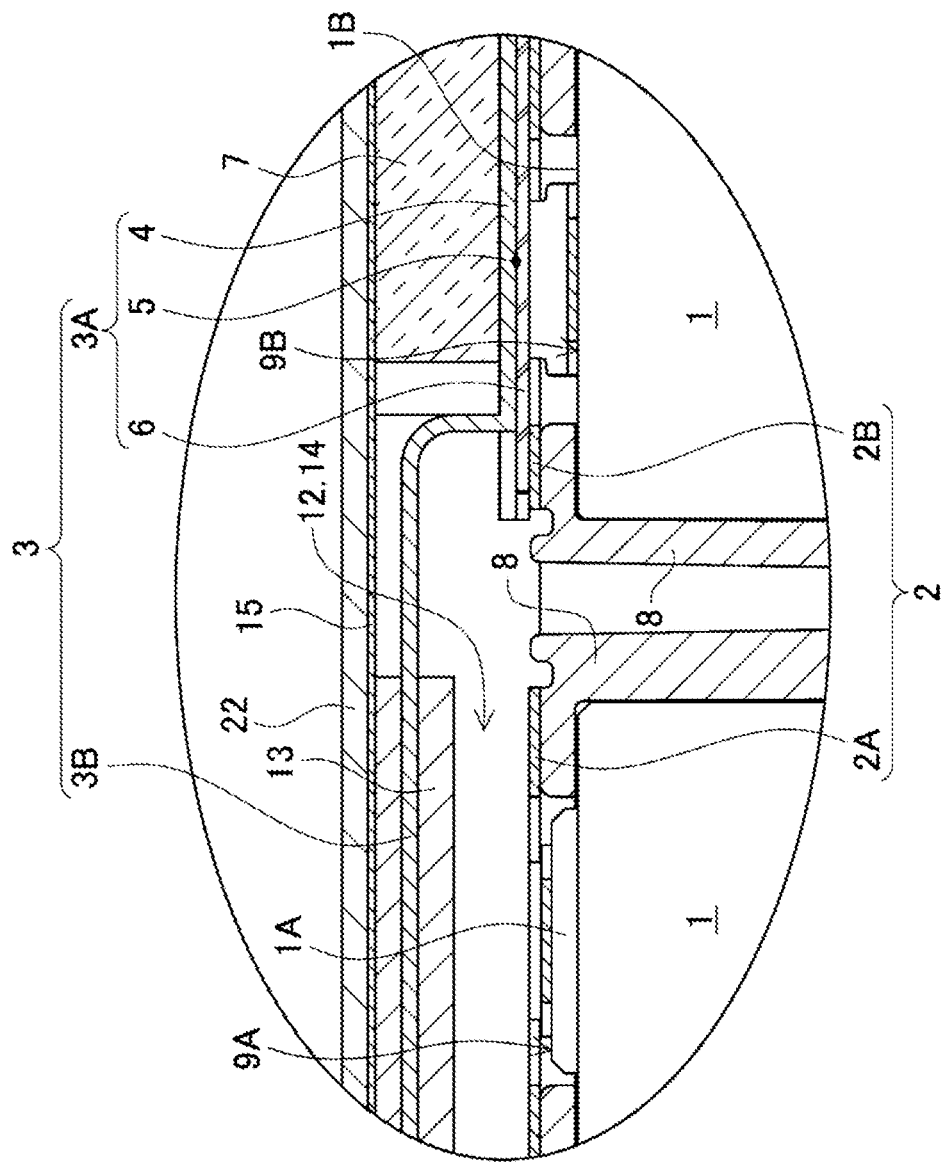
FIG. 8 is an enlarged cross-sectional view of a main part of the power supply device shown in FIG. 7.
Figure 9:
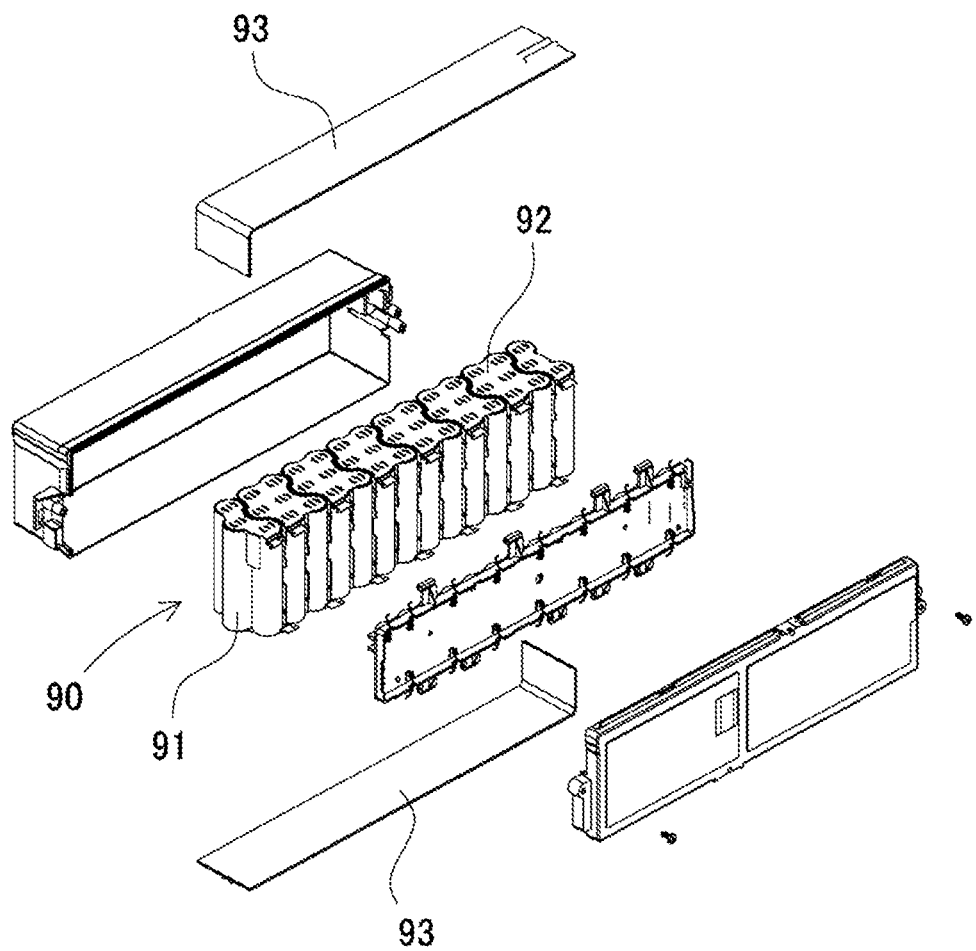
FIG. 9 is an exploded perspective view of a conventional power supply device.

As shown in FIGS. 6 to 8, sheet heater 3 includes base sheet 4 made of nonwoven fabric, heater wire 5 with which base sheets 4 is sewn, and insulating sheet 6 protecting heater wire 5. Base sheet 4 and insulating sheet 6 are flexible and cushioning nonwoven fabrics with, for example, plastic fibers three-dimensionally assembled without directionality. Heater wires 5 is a flexible resistive wire having a surface insulated by an insulating film. A surface of each base sheet 4 is sewn with the wire in a predetermined shape. Sheet heater 3 can adjust a partially heating state in accordance with a shape of heater wire 5 in base sheet 4. This is because heater wire 5 can be sewn in an optimum pattern to increase an amount of heat generation per unit area. Therefore, heater wire 5 in base sheet 4 such manner that battery cells 1 of each of core modules 9 may be uniformly heated. Battery block 10 is cooled by battery case 20, and a temperature of an outer peripheral portion is lower than that of a central portion. Therefore, in the outer peripheral portion of battery block 10, sheet heater 3 is sewn in a heater pattern denser than in the central portion to reduce temperature differences among all heated battery cells 1.

Sheet heater 3 is disposed at a position opposed to battery cells 1 not on a side of positive electrodes 1A, but only on one surface on a side of negative electrodes 1B, and is thermally coupled to battery cells 1 with lead plate 2 interposed to heat battery cells 1 from the side of negative electrodes 1B. Sheet heater 3 configured to heat negative electrodes 1B without heating positive electrodes 1A is placed on the side of negative electrode surface 9B of one surface of core module 9, and thermally coupled to a surface of negative electrode lead plate 2B. Sheet heater 3 heats each of battery cells 1 from the side of negative electrode 1B, which is one end portion, with negative electrode lead plate 2B interposed, and heats battery cell 1 from a bottom surface of an exterior can.

In power supply device 100 shown in FIG. 3, one sheet heater 3 is disposed on a surface of battery block 10 to heat a group pf battery cells 1 of each of core modules 9 from the side of negative electrodes 1B. As shown in FIGS. 6 to 8, in sheet heater 3, heating sheet portion 3A is provided at a position facing negative electrode surface 9B of each of core modules 9, and adjacent heating sheet portions 3A are joined by joining sheet portions 3B. Sheet heater 3 heats battery cells 1 from the side of negative electrodes 1B by disposing each of heating sheet portions 3A facing negative electrode surface 9B of each of core modules 9. Each of joining sheet portions 3B is disposed at a position facing positive electrode surface 9A of core module 9, and is disposed in a state insulated from positive electrode surface 9A. Sheet heater 3 has a single sheet shape as a whole by joining heating sheet portions 3A with joining sheet portions 3B.

In sheet heater 3 having a single sheet shape, since heating sheet portions 3A and joining sheet portions 3B have a unified structure, it is not necessary to connect heating sheet portions with lead wires as in a conventional sheet heater. In the sheet heater having the heating sheet portions connected by the lead wires, each of the lead wires is connected to the heater wire of each of heating sheet portions, and the adjacent heating sheet portions are electrically connected via this lead wire. Therefore, there are disadvantages that it takes time and effort to connect the heater wires and the lead wires, so that manufacturing efficiency is deteriorated and manufacturing cost is increased, and that a connection portion between each of the heater wires and each of the lead wires is easily disconnected. In contrast, in integrated sheet heater 3 having heating sheet portions 3A and joining sheet portions 3B of the unified structure, the connection structure between each of heater wires 5 and each of the lead wires is eliminated, heater wire 5 is sewn to a surface of one base sheet 4 in a predetermined heater pattern, and then, base sheet 4 is cut to greatly reduce the cost, so that mass production can be efficiently performed.

Further, in unified sheet heater 3 having each of heater wires 5 sewn to base sheet 4 in a predetermined pattern, the heater pattern is more densely arranged to increase the amount of heat generation in the outer portion of battery block 10 where heat is easily dissipated. The heater pattern is sparsely arranged to reduce the amount of heat generation in an inside of battery block 10 or in a vicinity where a heat generating component is disposed, so that a temperature of whole battery block 10 can be made close to uniform. The conventional sheet heater having a plurality of heating sheet portions connected by the lead wires is manufactured by separately manufacturing the plurality of heating sheet portions having different heater patterns and connecting the heating sheet portions having the different heater patterns by the lead wires. Therefore, it is necessary to select specific heating sheet portions having different shapes, to connect the selected heating sheet portions by the lead wires so as to dispose the selected heating sheet portions at specific positions, to define the installation positions of the respective heating sheet portions, and to install the heating sheet portions having the different heater patterns at accurate positions. Therefore, there is a disadvantage that the manufacturing process takes more time and effort. However, since integrated sheet heater 3 is manufactured by sewing heater wires 5 to base sheets 4 in the specific heater patterns at the specific positions, and then cutting is performed, the heater patterns having different shapes can be arranged at accurate positions without mistakes, and optimal design can be efficiently achieved.

An outer shape of heating sheet portion 3A is substantially equal to an outer shape of negative electrode surface 9B of core module 9 or an outer shape of negative electrode lead plate 2B welded to negative electrode surface 9B, and all negative electrode lead plates 2B are uniformly heated. In core module 9 of FIGS. 3 to 5, since negative electrode surface 9B has an elongated shape, the outer shape of heating sheet portion 3A also has an elongated shape. In elongated heating sheet portion 3A, both end portions in a longitudinal direction are joined by joining sheet portions 3B, and heating sheet portions 3A and joining sheet portions 3B are configured of one sheet heater 3. In sheet heater 3, both end portions of elongated heating sheet portions 3A are joined by joining sheet portions 3B, so that each of heating sheet portions 3A can be accurately disposed on negative electrode surface 9B of core module 9 without positional deviation when heating sheet portion 3A is set at a fixed position on the surface of battery block 10. In addition, it is possible to efficiently perform mass production of sheet heater 3 configured of the plurality of heating sheet portions 3A and the plurality of joining sheet portions 3B.

Heating sheet portion 3A is placed on negative electrode lead plate 2B to heat negative electrode lead plate 2B. Joining sheet portion 3B is disposed with insulating gap 12 provided between joining sheet portion 3B and positive electrode surface 9A, and is disposed to be insulated from positive electrode lead plate 2A. Insulating gap 12 insulates joining sheet portion 3B from positive electrode surface 9A more reliably by insulator 13.

Although joining sheet portions 3B join heater wires 5 to connect heating sheet portions 3A, heater wires 5 are not necessarily in both joining sheet portions 3B. This is because sheet heater 3 connecting heater wires 5 of all heating sheet portions 3A in series to one another heats all heating sheet portions 3A with one heater wire 5. Since joining sheet portion 3B that heater wire 5 is not connected to does not need to be insulated from positive electrode surface 9A, joining sheet portion 3B does not necessarily need to provide insulating gap 12 or insulator 13 between joining sheet portion 3B and positive electrode surface 9A.

As shown in FIG. 7, heating sheet portion 3A of sheet heater 3 is elastically pressed against the surface of negative electrode lead plate 2B with cushion sheet 7 interposed to efficiently and uniformly heat negative electrode lead plate 2B. As cushion sheet 7, an elastic sheet of a soft plastic foam such as a soft urethane foam as an insulator is suitable. However, a rubberlike elastic sheet that is elastically deformed by being pressing can also be used. Cushion sheet 7 is a sheet thicker than a distance between battery case 20 and negative electrode lead plate 2B in a non-pressing state, and elastically presses heating sheet portion 3A against negative electrode lead plate 2B in a state where cushion sheet 7 is sandwiched and crushed between battery case 20 and negative electrode lead plate 2B.

Cushion sheet 7 has an outer shape substantially identical to the outer shape of heating sheet portion 3A, and is placed only on the surface opposed to negative electrode lead plate 2B and not on the surface opposed to positive electrode lead plate 2A. In this structure, while heating sheet portion 3A is elastically pressed against negative electrode lead plate 2B, gap 14 configured to discharge released gas from a discharge valve (not shown) provided on the side of positive electrodes 1A of battery cells 1 can be provided between battery case 20 and positive electrode lead plate 2A. Further, it is also possible to prevent an adverse effect that moisture absorbed by cushion sheet 7 causes a short circuit on the side of positive electrodes 1A of battery cells 1.

As shown in FIGS. 1 and 2, battery case 20 houses battery block 10, and an upper opening portion of intermediate case 21 is closed by upper surface plate 22 and a lower opening portion is closed by lower surface plate 23. Intermediate case 21, upper surface plate 22, and lower surface plate 23 are made of metal, and are joined by a structure such as screwing, so that an inside has a closed structure.

In core modules 9 of battery block 10, battery cells 1 are disposed in a holder portion provided in plastic battery holder 8, and the plurality of battery cells 1 are disposed at fixed positions. Since battery holder 8 is manufactured by molding plastic as an insulator, peripheries of core modules 9 are insulated by battery holder 8. The peripheries of core modules 9 are insulated by battery holder 8, but conductive portions are exposed on the surfaces where negative electrode lead plate 2B and positive electrode lead plate 2A are disposed.

In battery case 20, insulating plates 15 such as plastic plates as insulators are disposed on inner surfaces of upper surface plate 22 and lower surface plate 23. In power supply device 100 having this structure, insulating plates 15 can insulate the inner surface of upper surface plate 22 and the inner surface of lower surface plate 23 to prevent negative electrode lead plates 2B and positive electrode lead plates 2A from coming into contact with metal battery case 20. As shown in a perspective view of FIG. 2, insulating plates 15 closing the upper and lower opening portions of intermediate case 21 are each provided with elastic bent portions 15A bent into a V-shape on outer peripheral edges. Each of elastic bent portions 15A is inserted into a gap between peripheral wall 24 of intermediate case 21 and battery block 10 to close the opening portion of intermediate case 21 without a gap. In power supply device 100 with the closed opening portions of intermediate case 21, the air heated by sheet heaters 3 is prevented from leaking to the outside and circulating, thereby increasing heating efficiency of the battery cells 1 by sheet heaters 3 and uniformly heating all the battery cells 1 via the heated internal air.

Power supply device 100 described above is assembled in the following processes.

1. Process for Manufacturing Battery Block 10

Battery cells 1 are placed at the fixed positions of plastic battery holder 8. After that, negative electrode lead plates 2B are welded to negative electrodes 1B of battery cells 1, and positive electrode lead plates 2A are welded to positive electrodes 1A to manufacture battery block 10.

Since battery block 10 is divided into core modules 9, in each of core modules 9, negative electrode lead plate 2B is welded to the side of negative electrodes 1B of battery cells 1, and positive electrode lead plate 2A is welded to the side of positive electrodes 1A. In adjacent core modules 9, negative electrode lead plate 2B and positive electrode lead plate 2A are alternately disposed, and negative electrode lead plates 2B and positive electrode lead plates 2A are connected in series by lead plate 2. However, adjacent core modules 9 are connected in parallel by connecting lead plates 2 on the opposite side of adjacent core modules 9.

2. Process for Placing Sheet Heaters 3 on Battery Block 10

Each of sheet heaters 3 is disposed on respective one of the surfaces of battery block 10. In sheet heater 3, heating sheet portions 3A are bonded to negative electrode lead plates 2B with a double-sided tape (not shown), and joining sheet portions 3B are disposed at positions facing positive electrode lead plates 2A in an insulated manner. In sheet heater 3, each of heating sheet portions 3A is bonded to a corresponding one of negative electrode lead plates 2B in opposition to each other without being displaced.

3. Process for Bonding Cushion Sheets 7 to Heating Sheet Portions 3A

Each of cushion sheets 7 is bonded to the surface of a corresponding one of heating sheet portions 3A of sheet heater 3 with a double-sided adhesive tape (not shown). Cushion sheet 7 is bonded to the surface of heating sheet portion 3A without being displaced.

4. Process for Inserting Battery Block 10 into Battery Case 20

The lower opening portion of intermediate case 21 is closed by lower surface plate 23 in a state where insulating plate 15 is disposed on the inner surface of lower surface plate 23. Lower surface plate 23 is fixed to intermediate case 21 by, for example, screwing. Battery block 10 with sheet heaters 3 and cushion sheets 7 bonded thereto is inserted into intermediate case 21 with the lower opening portion closed by lower surface plate 23, and is disposed at the fixed position. After that, insulating plates 15 are disposed on battery block 10, and each of elastic bent portions 15A provided in the outer peripheries of a corresponding one of insulating plates 15 is inserted between peripheral wall 24 of intermediate case 21 and battery block 10.

After that, upper surface plate 22 is fixed to intermediate case 21, and the upper opening portion of intermediate case 21 is closed by upper surface plate 22. Upper surface plate 23 is fixed to intermediate case 21 by, for example, screwing.

INDUSTRIAL APPLICABILITY

A power supply device according to the present invention includes a sheet heater configured to heat battery cells in a low temperature environment, and is suitably used in an electric device used for an application in a use environment of low temperature, for example, an electric device installed outdoors such as a base station.

REFERENCE MARKS IN THE DRAWINGS

100: power supply device
1: battery cell

1A: positive electrode
1B: negative electrode
2: lead plate
2A: positive electrode lead plate
2B: negative electrode lead plate
3: bsheet heater
3A: heating sheet portion
3B: joining sheet portion
4: base sheet
5: heater wire
6: insulating sheet
7: cushion sheet
8: battery holder
9: core module
9A: positive electrode surface
9B: negative electrode surface
10: battery block
11: space
12: insulating gap
13: insulator
14: gap
15: insulating plate
15A: elastic bent portion
20: battery case
21: intermediate case
22: upper surface plate
23: lower surface plate
24: peripheral wall
90: battery block
91: battery cell
92: lead plate
93: sheet heater

The invention claimed is:

1. A power supply device comprising:
a battery block including a plurality of battery cells, the plurality of battery cells including positive electrodes and negative electrodes, each of the plurality of battery cells including a corresponding one of the positive electrodes and a corresponding one of the negative electrodes at both ends of the each of the plurality of battery cells;
lead plates connected to the positive electrode and the negative electrode of the plurality of battery cells to electrically connect the battery cells to one another; and
a sheet heater configured to heat the battery cells, the sheet heater including a plurality of heating sheet portions, and a heater wire configured to interconnect the plurality of heating sheet portions, wherein
one of the lead plates connected to the positive electrode and the negative electrode disposed on one side of the battery block, the sheet heater is thermally coupled only to negative electrode lead plates, but not to positive electrode lead plates, wherein the heater wire is separated by a gap from the positive electrode lead plates.

2. The power supply device according to claim 1, wherein
the battery block is divided into a plurality of core modules,
the plurality of core modules include groups of battery cells out of the plurality of the battery cells, each of the plurality of core modules includes a corresponding group of the battery cells,
the groups of the battery cells of the plurality of core modules are arranged in parallel to one another,
the plurality of core modules have negative electrode surfaces which negative electrodes of the groups of the battery cells are flush with,
the plurality of core modules have positive electrode surfaces which positive electrodes of the groups of the battery cells are flush with, the positive electrode surfaces of the plurality of core modules being opposite to the negative electrode surfaces of the plurality of core modules,
the lead plates are disposed on the negative electrode surfaces and the positive electrode surfaces of the plurality of core modules,
negative electrode lead plates out of the lead plates which are on the negative electrode surfaces are connected to the negative electrodes of the groups of battery cells,
positive electrode lead plates out of the lead plates which are on the positive electrode surfaces are connected to the positive electrodes of the group of the battery cells,
the sheet heater is thermally coupled to and placed on surfaces of the negative electrode lead plates on sides of the negative electrode surfaces of the plurality of core modules, and
the sheet heater is configured to heat the groups of the battery cells from the negative electrodes that are one end portions of the groups of the battery cells via the negative electrode lead plates.

3. The power supply device according to claim 1, wherein the sheet heater includes:
a base sheet made of nonwoven fabric;
the heater wire, wherein the base sheet is sewn with the heater wire; and
an insulating sheet protecting the heater wire, and
the insulating sheet contacts the one of the lead plates.

4. The power supply device according to claim 2, wherein
the plurality of core modules are disposed in an array in the battery block such that the negative electrode surfaces and the positive electrode surfaces are alternately disposed while one or more negative electrode surfaces out of the negative electrode surfaces are flush with one or more positive electrode surfaces out of the positive electrode surfaces,
the sheet heater includes:
the plurality of heating sheet portions, said heating sheet portions configured to heat the negative electrode surfaces of the plurality of core modules; and
a joining sheet portion configured to join adjacent ones of the heating sheet portions, and
the joining sheet portion is disposed opposed to one of the positive electrode surfaces of the plurality of core modules.

5. The power supply device according to claim 4, wherein
each of the heating sheet portions has an elongated shape, and
the joining sheet portion is joined to both end portions of the heating sheet portions in a longitudinal direction.

6. The power supply device according to claim 5, wherein the joining sheet portion is disposed apart from one of the positive electrode surfaces via an insulating gap between the joining sheet portion and the one of the positive electrode surfaces.

7. The power supply device according to claim 4, wherein
the heater wire includes a first heater wire with which the joining sheet portion is sewn, and a second heater wire provided in the heating sheet portions, and
the first heater wire with which the joining sheet portion is sewn and the second heater wire of the heating sheet portions are a continuous heater wire.

8. The power supply device according to claim 4, further comprising:

a battery case accommodating the battery block therein; and a cushion sheet disposed between the battery case and each of the heating sheet portions, wherein the cushion sheet elastically presses the heating sheet portions against the negative electrode lead plates.

9. The power supply device according to claim 4, wherein the sheet heater comprises sheet heaters disposed on both surfaces of the battery block, the heating sheet portions are placed on the negative electrode lead plates of the plurality of core modules, and the heating sheet portions face the negative electrodes of all the plurality of battery cells.

10. The power supply device according to claim 1, wherein the plurality of battery cells is cylindrical batteries.

* * * * *